(12) United States Patent  
Takase et al.

(10) Patent No.: US 7,703,655 B2
(45) Date of Patent: Apr. 27, 2010

(54) FRICTIONAL SPOT JOINING METHOD AND FRICTIONAL SPOT JOINING APPARATUS

(75) Inventors: Kenji Takase, Hiroshima (JP); Toshiyuki Gendou, Hiroshima (JP); Yohei Shoji, Hiroshima (JP)

(73) Assignee: Mazda Motor Corporation (JP)

( * ) Notice: Subject to any disclaimer, the term of this patent is extended or adjusted under 35 U.S.C. 154(b) by 579 days.

(21) Appl. No.: 11/506,780

(22) Filed: Aug. 21, 2006

(65) Prior Publication Data
US 2007/0068993 A1 Mar. 29, 2007

(30) Foreign Application Priority Data
Sep. 29, 2005 (JP) ............................. 2005-283707

(51) Int. Cl.
*B23K 20/12* (2006.01)
*B23K 37/00* (2006.01)
(52) U.S. Cl. ..................................... 228/2.1; 228/112.1
(58) Field of Classification Search ............... 228/2.1, 228/44.3, 47.1, 112.1
See application file for complete search history.

(56) References Cited

U.S. PATENT DOCUMENTS

| | | | | |
|---|---|---|---|---|
| 5,611,479 | A | * | 3/1997 | Rosen ....................... 228/112.1 |
| 6,050,474 | A | * | 4/2000 | Aota et al. ................ 228/112.1 |
| 6,360,937 | B1 | * | 3/2002 | De Koning ............... 228/112.1 |
| 2003/0029903 | A1 | * | 2/2003 | Kashiki et al. ........... 228/112.1 |
| 2005/0035180 | A1 | | 2/2005 | Nishiguchi et al. | |
| 2005/0145678 | A1 | * | 7/2005 | Murakami ................ 228/112.1 |
| 2006/0138198 | A1 | * | 6/2006 | Gendou et al. ........... 228/112.1 |

FOREIGN PATENT DOCUMENTS

| | | | |
|---|---|---|---|
| CN | 1436110 A | | 8/2003 |
| JP | 2004167511 A | | 6/2004 |
| JP | 2006136906 A | * | 6/2006 |
| WO | 0185385 A1 | | 11/2001 |

OTHER PUBLICATIONS

JPO machine translation of JP 2006-136906A.*

* cited by examiner

*Primary Examiner*—Jessica L. Ward
*Assistant Examiner*—Kevin E Yoon
(74) *Attorney, Agent, or Firm*—Studebaker & Brackett PC; Donald R. Studebaker

(57) ABSTRACT

In a frictional spot joining where plural metal members lapping over are jointed with a joining device comprising a rotating tool, a receiving tool disposed on a rotational axis of the rotating tool and a drive device to rotate and move the rotating tool in a pushing direction, a holding member is provided on a side of the receiving tool, which has a restriction portion to restrain a movement of the receiving tool in a direction perpendicular to the rotational axis, and the joining device is moved by a moving device such that the receiving tool is disposed at the restriction portion. Accordingly, the rotational runout of the rotating tool can be restrained effectively with a simple structure of a properly small-sized rotating tool and receiving tool.

4 Claims, 12 Drawing Sheets

FRICTIONAL SPOT JOINING METHOD AND FRICTIONAL SPOT JOINING APPARATUS

BACKGROUND OF THE INVENTION

The present invention relates to a frictional spot joining method and apparatus in which a plurality of metal members are provided to lap over and these metal members are joined with a frictional heat by a rotating tool.

Recently, aluminum alloy or the like have been widely used as material to be applied to a vehicle body of an automotive vehicle for the purpose of a weight reduction. Accordingly, for example, joining of members made of aluminum alloy or joining of an aluminum-alloy member and a member made of iron or steel have been used. Herein, since joining with welding may be difficult for these members, joining with rivet has been generally used for these members. However, the rivet joining is generally expensive.

Meanwhile, a frictional spot joining is known as an appropriate joining method that can be applied with reasonably low costs. In this joining method, a plurality of metal members are provided to lap over, a rotating tool is pushed against the metal members such that the metal member is softened and made in a plastic flow state by a frictional heat, whereby metal members can be joined in a solid state (joining in a slid state without melting) with a temperature lower than a melting point of a work to be joined (metal members).

For example, US Patent Application Publication No. 2005/0035180 A1 discloses a frictional spot joining method and apparatus for a zinc-plating steel plate and an aluminum plate. This apparatus comprises a joining device that integrally has a rotating tool, a receiving tool that is disposed to face the rotating tool on a rotational axis of the rotating tool, and a drive device operative to rotate and move the rotating tool in a pushing direction.

Meanwhile, a rotational runout of the rotating tool tends to occur when a tip (shoulder portion) of the rotating tool contacts a work in this frictional spot joining. Namely, a continuous movement of the receiving tool in a direction that is substantially perpendicular to the rotational axis of the rotating tool tends to occur due to a rapid increase of the contact resistance. It is generally known that a projection (pin) with a smaller diameter is formed at the shoulder portion in order to restrain the above-described rotational runout. Namely, the pin contacts first with a small contact resistance at the joining, thereby providing a proper centering (anchor function). The rotational runout can be restrained by this anchor function.

However, it may be difficult to prevent the rotational runout perfectly by this anchor function, so the rotational runout would exist to some extent. However, this rotational runout would cause an adhesion (sticking) of part of the work to the shoulder portion. This adhesion would deteriorate the above-described anchor function and promote the rotational runout. As a result, the rotational runout would occur more badly. This would deteriorate the joining quality or cause damages to the rotating tool, its drive mechanism or other tools.

In order to avoid the above-described situation, it would be effective to restrain the rotational runout (movement) of the rotating tool further, so an initial occurrence of the adhesion to the shoulder portion could be prevented. Japanese Patent Laid-Open Publication No. 2003-205374 discloses a frictional spot joining device equipped with a fixing device having a spring and a pressing member that are provided around the rotating tool, which is operative to restrain the rotational runout (corresponding to a lateral runout in this publication).

The pressing member of this fixing device is a substantially cylindrical member that is provided coaxially outside the rotating tool, which restrains via a bearing a movement of the rotating member in a direction that is perpendicular to the rotational axis of the rotating member. And, when the joining is executed, this member contacts the work first, prior to the rotating member contacting the work, and is pressed against the work by the spring. Thus, the work and pressing member are integrated temporarily, so the movement of the rotating tool in the direction perpendicular to the rotational axis relative to the work is restrained via the bearing. Namely, the rotational runout can be restrained.

However, the fixing device shown in the above-described latter publication comprises the spring, bearing and so on, therefore its structure would be rather complicated. Also, its size would be relatively large so as to enclose the rotating tool, so that the joining in a narrow space would be difficult. In fact, the rotating tool is required to go through a narrow gap space between clamping tools fixing the work and approach to the work, so a large-sized device would be inappropriate.

SUMMARY OF THE INVENTION

The present invention has been devised in view of the above-described problem, and an object of the present invention is to provide a frictional spot joining method and apparatus that can restrain the rotational runout (movement) of the rotating tool effectively with a simple structure of properly small-sized rotating tool and receiving tool.

According to the present invention, there is provided a frictional spot joining method, in which a plurality of metal members that lap over are jointed with a joining device that integrally has a rotating tool, a receiving tool that is disposed to face the rotating tool substantially on a rotational axis of the rotating tool and a drive device operative to rotate and move the rotating tool in a pushing direction toward the metal members, the metal members lapping over being located between the rotating tool and the receiving tool of the joining device when being joined, the rotating tool being configured to be pushed against one of the metal members such that the one of the metal members is softened and made in a plastic flow state by a frictional heat generated by the rotating tool, the method comprising a step of providing a holding member to be located on a side of the receiving tool when the metal members are joined, the holding member having a restriction portion that is operative to restrain a movement of the receiving tool in a direction that is substantially perpendicular to the rotational axis of the rotating tool, and a step of moving the joining device by a moving device such that the receiving tool is disposed at the restriction portion of the holding member, whereby the above-described movement of the receiving tool can be restrained by the restriction portion of the holding member when the metal members are joined.

According to the frictional spot joining method of the present invention, since the rotating tool and the drive device are integrally provided at the joining device, the rotational runout of the rotating tool occurring would cause a vibration of the entire joining device. And, this vibration would be transmitted to the receiving tool integrally provided at the joining device as well. Namely, once the rotational runout occurs at the rotating tool, the vibration (runout) of the receiving tool would occur in the direction perpendicular to the rotational axis of the rotating tool. Herein, this runout of the receiving tool can be restrained properly by the restriction portion of the holding member of the present invention. And, the runout of the rotating tool can be also restrained properly with a reaction function of this restraint of the receiving tool by the holding member.

Herein, since the receiving tool needs not to rotate, there is no need for providing a bearing member to restrain the runout of the receiving tool. Also, since the receiving tool is generally used in such a manner that it contacts the work prior to contacting of the rotating tool with the work, there may be no need for providing additional members such as springs to press it against the work. Further, since the holding member is provided beside the work, it may be unnecessary for any additional member to be provided at the rotating tool or the receiving tool. Accordingly, properly small-sized tools can be obtained.

As apparent from the above, the present invention can restrain the rotational runout of the rotating tool effectively by the simple structure with the properly small-sized rotating tool and receiving tool.

The restraint of the rotational runout can also prevent the adhesion of the work to the shoulder portion of the rotating tool. Thus, promotion of the rotational runout, decrease of joining quality, any damage of the rotating tool, its drive mechanism or clamping tool can be avoided properly.

Further, proper size down and costs reduction of devices can be attained by the simple structure. Particularly, this would be very useful in a case where some clamping tools to fix the work are provided and the rotating tool and receiving tool are moved toward the work through narrow gaps formed between these clamping tools.

Further, according to the present invention, there is provided a frictional spot joining apparatus, in which a plurality of metal members that lap over are jointed with a joining device that integrally has a rotating tool, a receiving tool that is disposed to face the rotating tool substantially on a rotational axis of the rotating tool and a drive device operative to rotate and move the rotating tool in a pushing direction toward the metal members, the metal members lapping over being located between the rotating tool and the receiving tool of the joining device when being joined, the rotating tool being configured to be pushed against one of the metal members such that the one of the metal members is softened and made in a plastic flow state by a frictional heat generated by the rotating tool, the apparatus comprising a holding member that is located on a side of the receiving tool when the metal members are joined, the holding member having a restriction portion that is operative to restrain a movement of the receiving tool in a direction that is substantially perpendicular to the rotational axis of the rotating tool, and a moving device operative to move the joining device such that the receiving tool is disposed at the restriction portion of the holding member, whereby the above-described movement of the receiving tool can be restrained by the restriction portion of the holding member when the metal members are joined.

According to this frictional spot joining apparatus, substantially the same effects as that of the above-described frictional spot joining method can be provided.

According to an embodiment of the above-described present invention, the metal members comprise a first metal member and a second metal member, a melting point of the second metal member being higher than that of the first metal member, the rotating tool comprises a shoulder portion that is formed at a tip thereof having a ring-shaped recess and a pin that projects from the shoulder portion to be located substantially on the rotational axis of the rotating tool, and the rotating tool is configured to be pushed against the first metal member such that the rotating tool goes into the first metal member without reaching the second metal member, whereby only the first metal member can be softened and made in the plastic flow state by the frictional heat generated by the rotating tool and spot faces of the first and second metal members are joined in a solid state.

According to this embodiment, the pin and shoulder portion having the ring-shaped recess are pressed into only the first metal member having the lower melting point without reaching the second metal member. Thereby, even in a case where the pin is formed so short that the above-described anchor function may be restricted and adhesion of work materials to the ring-shaped recess of the shoulder portion tends to occur easily, the rotational runout of the rotating tool can be restrained effectively by the restriction portion restraining the movement of the receiving tool.

According to another embodiment of the present invention, the restriction portion comprises a through hole that is formed at the holding member, the through hole having a shape that allows the receiving tool to go therein when the metal members are joined.

Thereby, the restriction portion can be constituted by a very simple structure of the through hole.

According to further another embodiment of the present invention, there is further provided a clamping tool to fix the metal members lapping over in a joining position, and the holding member is fixed to the clamping tool that contacts a face of a joining area of the metal members and a tip of the receiving tool supports the metal members via the clamping tool.

Thereby, any problems caused by a direct contact of the receiving tool with the work, such as a pressing mark of the rotating tool that would be formed on the surface of the work, or the adhesion of zinc plating, which is softened or melt by the frictional heat, to the receiving tool, can be avoided properly.

According to further another embodiment of the present invention, the moving device comprises a robot.

Thereby, since the robot with superior flexibility of movement is used, the joining can be provided smoothly and efficiently.

Other features, aspects, and advantages of the present invention will become apparent from the following description which refers to the accompanying drawings.

DETAINED DESCRIPTION OF THE INVENTION

Hereinafter, a preferred embodiment of the present invention will be described referring to the accompanying drawings. First, a frictional spot joining apparatus 1 of the present invention will be described.

Figure 1:
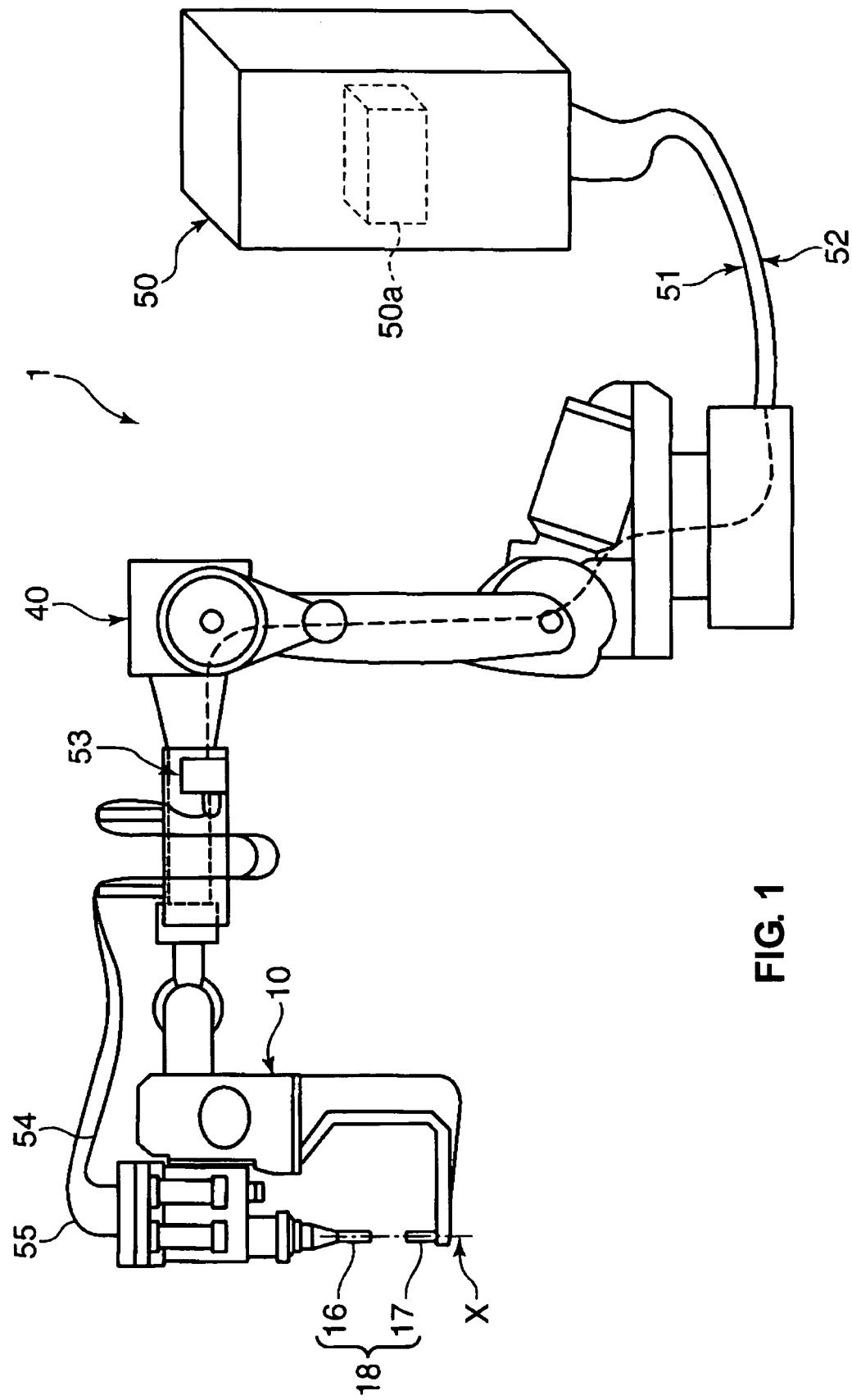
FIG. 1 is a schematic constructive diagram of a frictional spot joining apparatus according to an embodiment of the present invention.

FIG. 1 is a schematic constructive diagram of the frictional spot joining apparatus 1. The frictional spot joining apparatus 1 comprises mainly a joining gun 10 (joining device) and a robot 40 (moving device) equipped with the joining gun 10 at its arm's tip. A conventional six-axis multiple-articulated type of robot may be used as this robot 40.

The robot 40 is coupled to a control device 50 via a harness 51. The joining gun 10 is coupled to the control device 50 via harnesses 52, 54 and 55 and a joint box 53. A control unit 50a is disposed in the control device 50, which controls the robot 40 such that the joining gun 10 can take a predetermined location and position. Also, the control unit 50a controls a motor for pressing 14 and a motor for rotating 15 (see FIG. 2) that are installed at the joining gun 10, which will be described below, such that a joining tool 18 comprising a rotating tool 16 and a receiving tool 17 can perform a predetermined operation.

Figure 2:
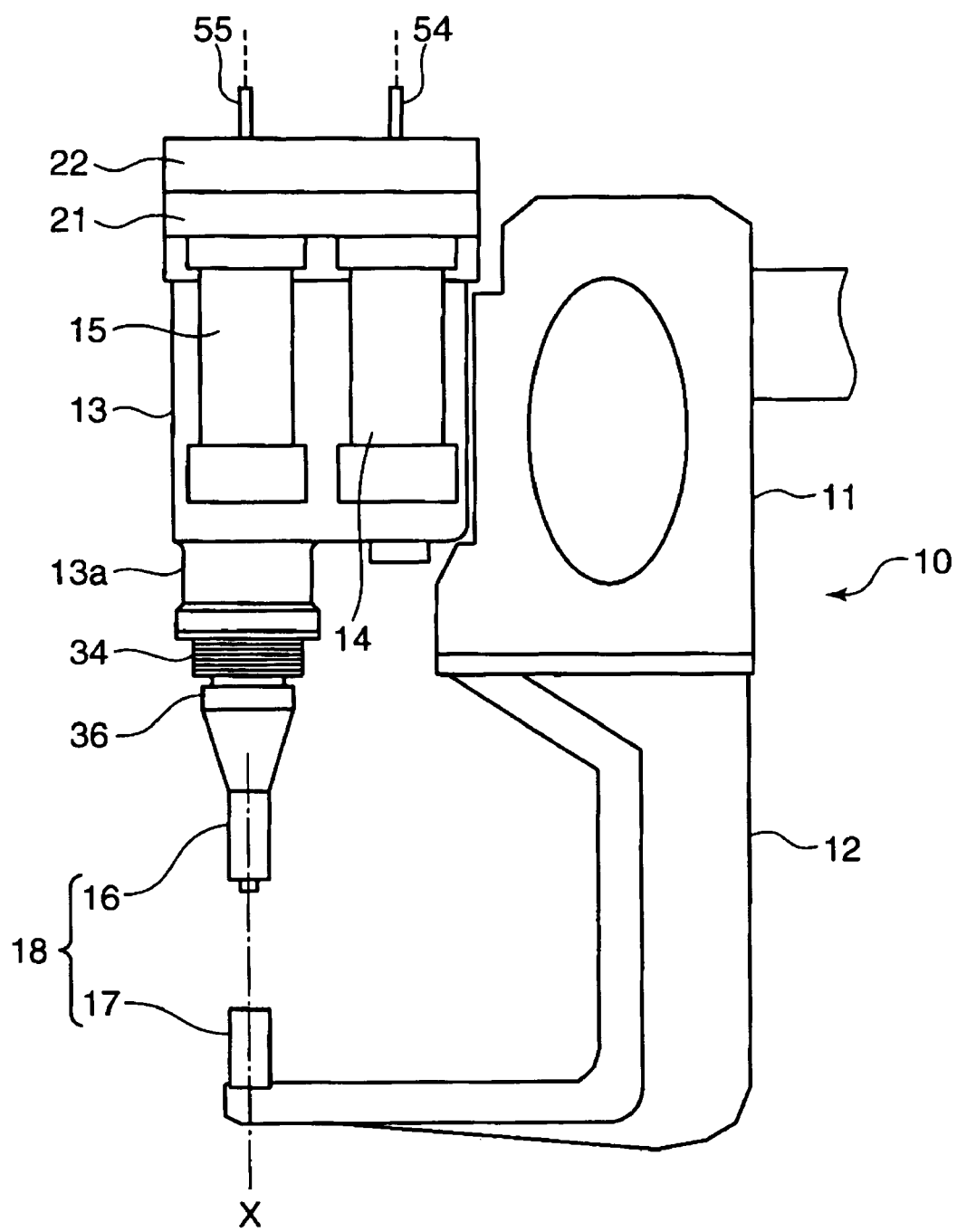
FIG. 2 is an elevation view of a joining gun shown in FIG. 1.
Figure 3:
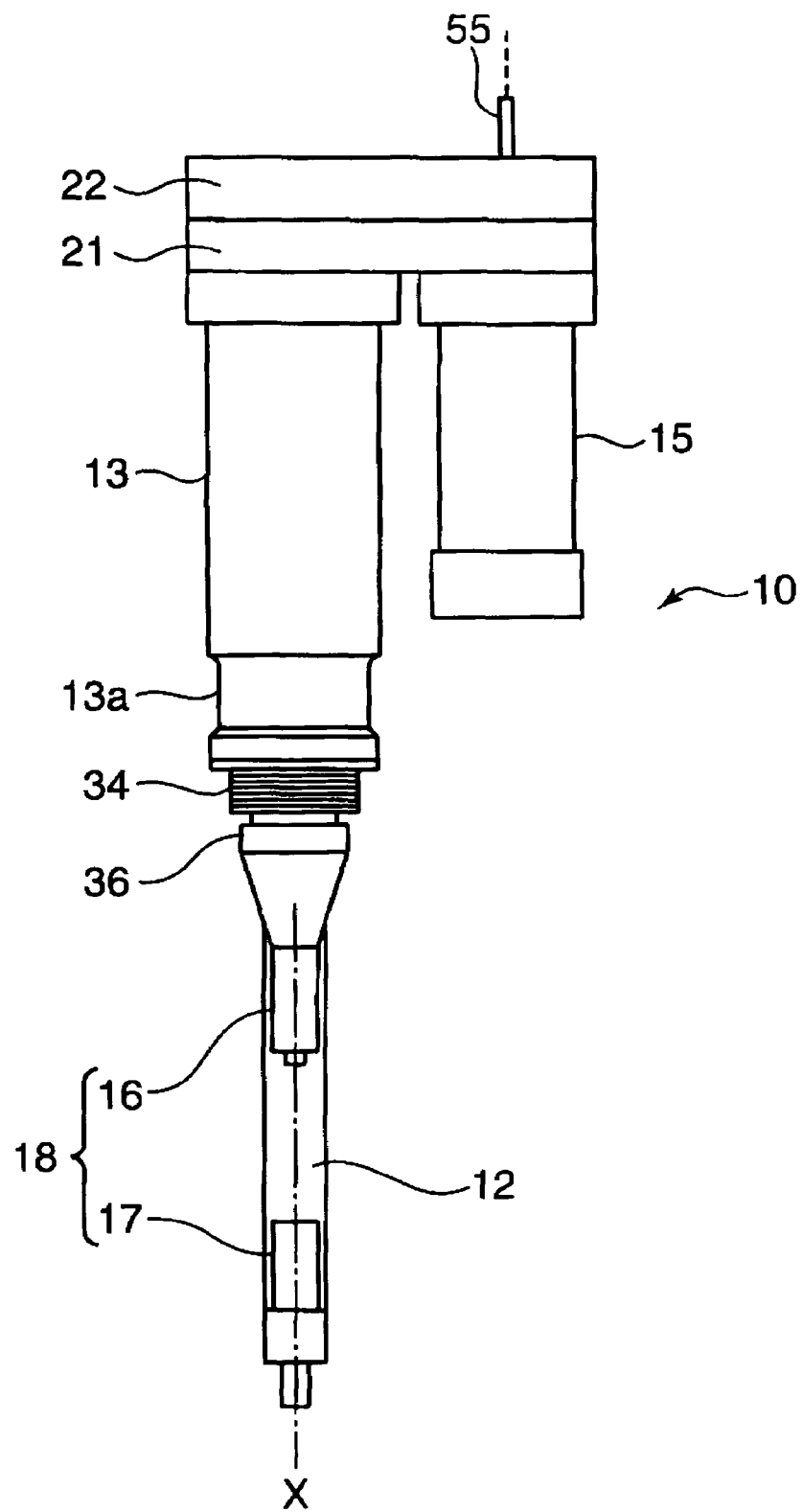
FIG. 3 is a side view of the joining gun shown in FIG. 1.

FIG. 2 is an elevation view of the joining gun 10, and FIG. 3 is a side view of the joining gun 10. The joining gun 10, as shown in these figures, comprises an attaching box 11 for attachment to the robot 40, a L-shaped arm 12 that extends downward from a lower face of the attaching box 11, a body case 13 that is attached to a side face of the attaching box 11 above the arm 12, the pressing motor 14 that is coupled via the harness 54, and the rotating motor 15 that is coupled via the harness 55.

At a lower end of the body case 13 is provided the rotating tool 16, one part of the joining tool 18. Meanwhile, at a tip of the arm 12 is provided the receiving tool 17, the other part of the joining tool 18, which is disposed to face the rotating tool 18 substantially on a rotating axis X of the rotating tool 16.

The frictional spot joining is executed with the rotating tool 16 and the receiving tool 17 in such a manner that a work to be joined (a plurality of metal members that lap over) is located between these tools 16, 17. Specifically, the receiving tool 17 receives the work such that a tip of the receiving tool 17 contacts one face of the work (if necessary, via a clamping tool), and a tip of the rotating tool 16 that rotates around the rotational axis is pressed against the other face of the work, which will be described in detail later. In this way, the frictional spot joining is executed.

Figure 4:
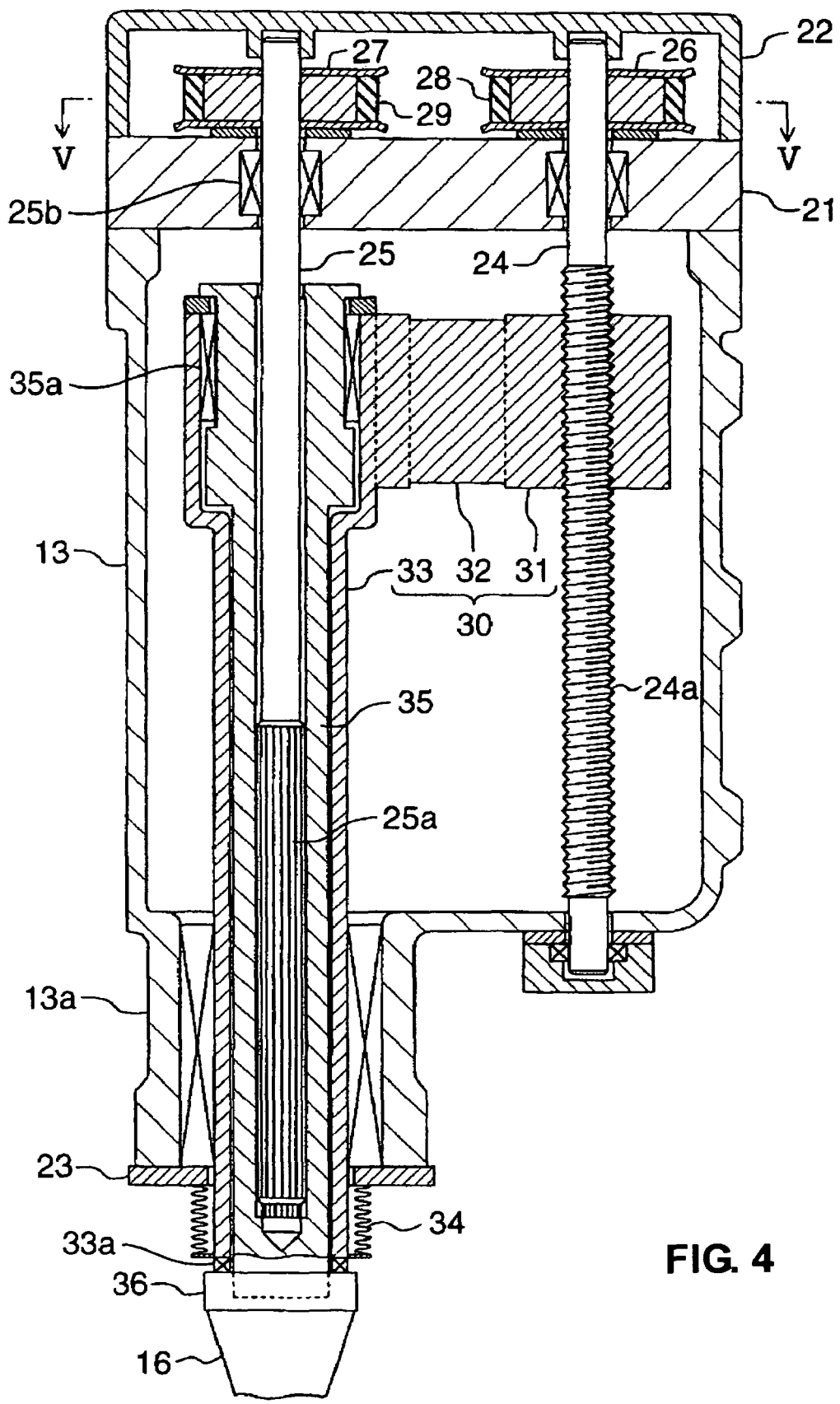
FIG. 4 is a sectional view showing an inside structure of a body case shown in FIG. 1.
Figure 5:
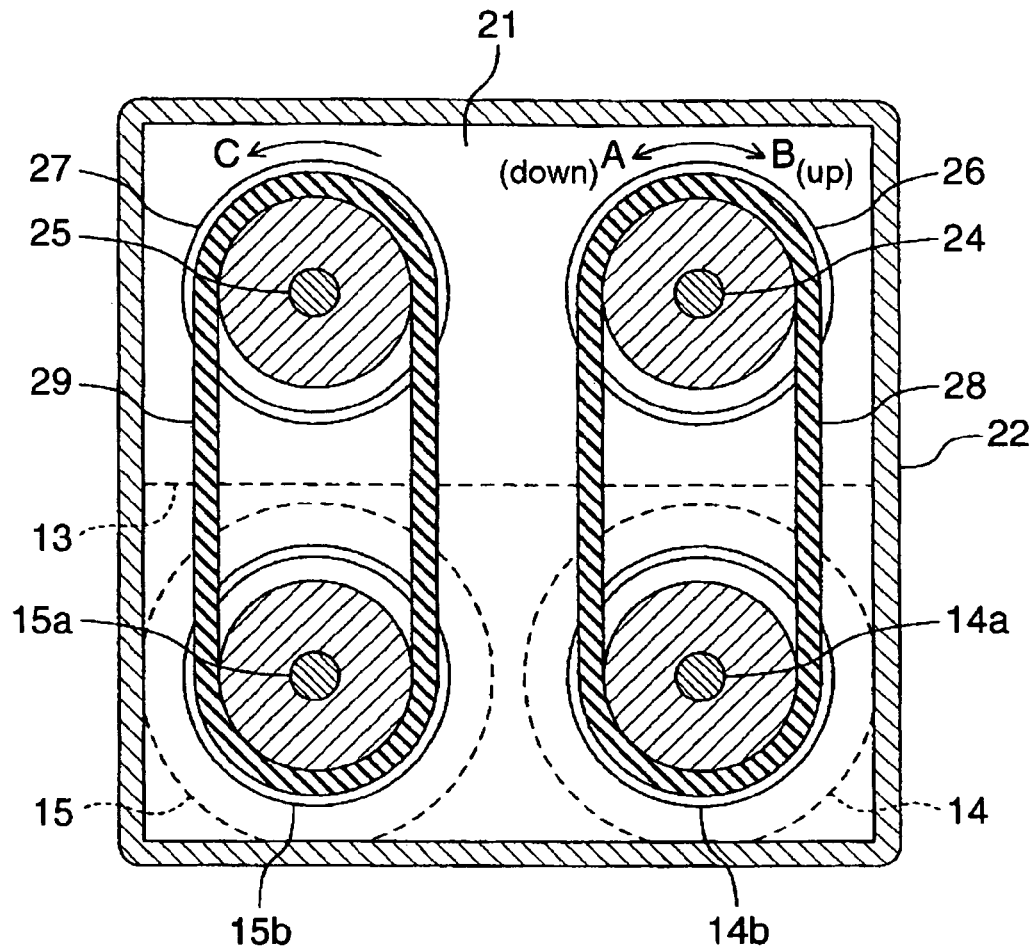
FIG. 5 is a sectional view taken along line V-V of FIG. 4.

FIG. 4 is a sectional view showing an inside structure of the body case 13, and FIG. 5 is a sectional view taken along line V-V of FIG. 4. Inside the body case 13 are provided a screw shaft (elevating shaft) 24 and a spline shaft (rotating shaft) 25 that extend vertically in parallel so as to rotate around their axes independently. Respective upper ends of these shafts 24, 25 penetrate an upper lid member 21 and reach inside an upper cover 22, where driven pulleys 26, 27 are attached to the shafts 24, 25, respectively. The upper lid member 21 and upper cover 22 are, as shown in FIG. 5, provided so as to project from the upper of the body case 13 to the side of the body case 13, and the pressing motor 14 and rotating motor 15 are fixed to the lower face of this projection part of the upper lid member 21. Respective tip ends (upper ends) of output shafts 14a, 15a of these motors 14, 15 penetrate the upper lid member 21 and reach inside the upper cover 22, where drive pulleys 14b, 15b are attached to the output shafts 14a, 15a, respectively. And, drive belts 28, 29 are provided between the drive pulleys 14b, 15b and the driven pulleys 26, 27, so the screw shaft 24 can be rotated in a direction A (for a downward movement) or a direction B (for an upward movement) in FIG. 5 with the pressing motor 14, and the spline shaft 25 can be rotated in a direction C in FIG. 5 with the rotating motor 15.

Returning to FIG. 4, the description will be continued. An elevating block 31 is engaged with a screw portion 24a of the screw shaft 24, and a rotating cylinder 35 is engaged with a spline portion 25a of the spline shaft 25. The rotating cylinder 35 is provided to rotate inside the elevating cylinder 33 that is integrally coupled to the elevating block 31 via a coupling member 32. The spline shaft 25, elevating cylinder 33 and rotating cylinder 35 are disposed coaxially. Hereinafter, an integral body of the elevating block 31, coupling member 32 and elevating cylinder 33 is referred to as an elevating member 30 as a whole.

At the lower face of the body case 13 is formed a cylindrical-shaped downward-projecting portion 13a, a lower end of which has a lower cover 23 attached thereto. Respective lower ends of the elevating cylinder 33 and rotating cylinder 35 penetrate the lower cover 23 and project downward. The rotating cylinder 35 located inside projects downward further from the elevating cylinder 33 located outside, and an attaching member 36 is fixed to its lower end. The rotating tool 16 is detachably attached to this attaching member 36. The rotational axis X of the rotating tool 16 attached is coaxial with an axis of the spline shaft 25. Herein, a bellows 34 is provided between the lower cover 23 and the lower end of the elevating cylinder 33 to protect an outer surface of the elevating cylinder 33 from any pollution or the like outside the body case 13.

Herein, bearings 25b, 35a and 33a are respectively disposed between the spline shaft 25 and the upper lid member 21, the elevating cylinder 33 and the rotating cylinder 35, and the elevating cylinder 33 and the attaching member 36.

It is preferable that a servo motor operative to control and detect a rotational angle easily be used as the pressing motor 14, and that such a servo motor or an induction motor to control easily a rotational speed be used as the rotating motor 15. The motors 14, 15 constitute a drive device operative to rotate and press the rotating tool 16 against the work.

Figure 6:
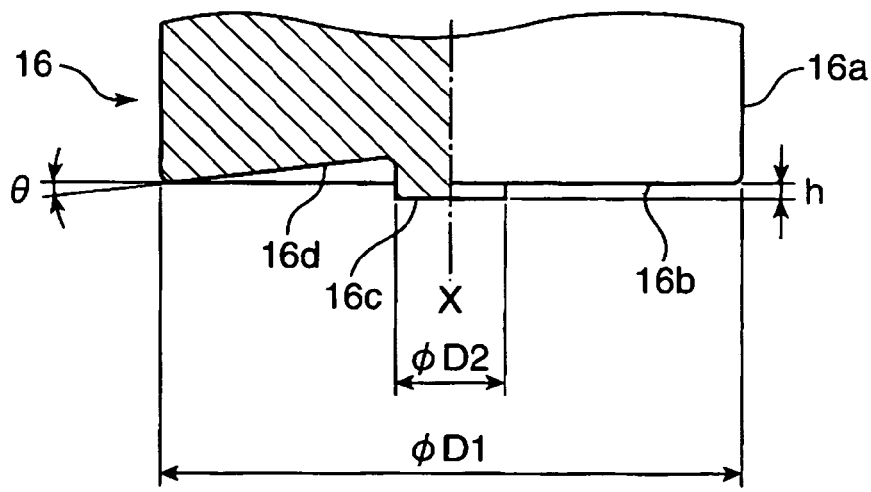
FIG. 6 is an enlarged view of a tip of a rotating tool shown in FIG. 1.

FIG. 6 is an enlarged view of a tip of the rotating tool 16. The tip of the rotating tool 16 comprises a shoulder portion 16b, which is a lower end face (circular-shaped) of a cylindrical body portion 16a, that faces the work, a pin 16c that projects from the shoulder portion 16b toward the work by a specified length h having a smaller diameter than the shoulder portion 16b and is located substantially on the rotational axis X of the rotating tool 16, and a ring-shaped recess 16d that is provided around the pin 16c at the shoulder portion 16d. In the present embodiment, the ring-shaped recess 16d is formed in a corn shape with its center coaxial with the rotational axis X of the rotating tool 16 in such a manner that a bottom face of the ring-shaped recess 16d is inclined with its recess depth outside gradually becomes smaller as shown in the figure. The rotating tool 16 has, for example, 10 mm of a diameter D1 of the shoulder portion 16b, 2 mm of a diameter D2 of the pin 16c, 0.3-0.35 mm of the projection length h of the pin 16c, and 5-7 degree of an inclined angle θ of the bottom face of the ring-shaped recess 16d relative to the shoulder portion 16b.

Herein, a preferred shape of the rotating tool 16 may be determined according to usage factors such as work's material, thickness or the number. Accordingly, it is preferable that a number of different kinds of rotating tools 16 be prepared and the best one be selected among them according to its usage. The rotating tool 16 with the ring-shaped recess 16d shown in FIG. 6 is particularly effective in a case where different kinds of metal members having different melting points are joined.

Next, operations of the frictional spot joining apparatus 1 at the joining will be described.

At first, elevation and rotation operations of the rotating tool 16 will be described. Herein, although a direction of the rotational axis X of the rotating tool 16 is changeable by the robot 40, an operation of the rotating tool 16 where it goes toward the receiving tool 17 will be referred to as "going down", and an operation of the rotating tool 16 where it goes away from the receiving tool 17 is referred to as "going up".

When the screw shaft 24 is rotated in the direction A in FIG. 5 by the pressing motor 14, the elevating member 30 goes down, engaging with the screw portion 24a, and thereby the rotating cylinder 35 provided inside the elevating member 33 and the rotating tool 16 attached to the lower end of the rotating cylinder 35 via the attaching member 36 go down together. To the contrary, when the screw shaft 24 is rotated in the direction B in FIG. 5 by the pressing motor 14, the elevating member 30 goes up, engaging with the screw portion 24a, and thereby the rotating cylinder 35 and the rotating tool 16 go up together. Accordingly, the pressing motor 14 operates to move the rotating tool 16 in the direction of the rotational axis X of the rotating tool 16 in such a manner that it approaches or goes away from the work located between the both tools 16, 17, which will be described in detail below. And, the pressing motor 14 is configured to press the rotating tool 16 against the work, and herein a pressing force is changeable according to an electric current supplied to the pressing motor 14.

Meanwhile, when the spline shaft 25 is rotated in the direction C in FIG. 5 by the rotating motor 15, the rotating cylinder 35 rotates, independently from the movement of the above-described elevating member 30, in the same direction C, engaging with the spline portion 25a, and the rotating tool 16 attached to the rotating cylinder 35 rotates also around its rotational axis X in the same direction C. Herein, a rotational speed of the rotating tool 16 is changeable according to an electric current supplied to the rotating motor 15 as well.

Next, operation of the work joining with the rotating tool 16 will be described.

Figure 7:
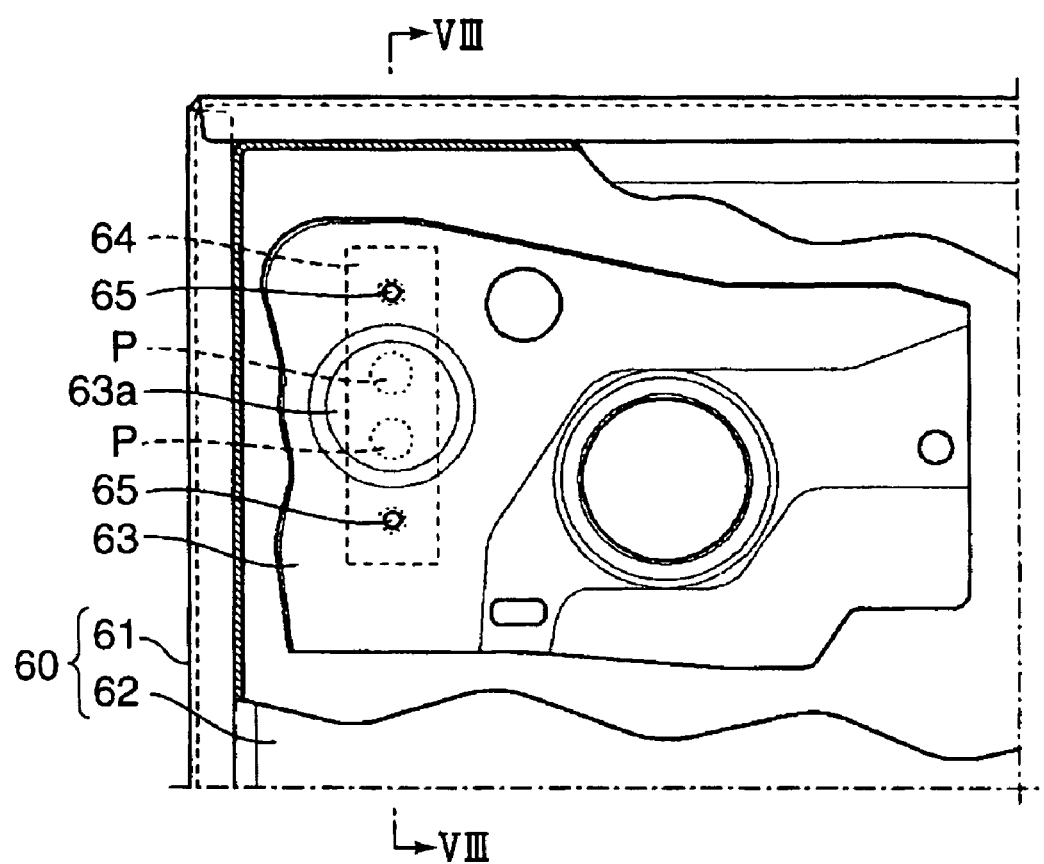
FIG. 7 is a partial cut view of a work according to the embodiment of the present invention, showing a hinge attaching portion of a trunk lid of an automotive vehicle, when viewed from a side of an inner panel.

FIG. 7 shows a use state of a constructive member of an automotive vehicle body in the frictional spot joining according to the method of the present invention. This constructive member of the automotive vehicle body comprises a reinforcement 63 of a trunk lid 60 and a bolt retainer 64 for attaching a hinge 70 (see FIG. 8) to the trunk lid 60. These members 63, 64 are provided at right and left corner sides inside the trunk lid 60, which is formed with an outer panel 61 and an inner panel 62 that are attached with their peripheral edges hemmed each other. Herein, the reinforcement 63 is made of 6000-based aluminum alloy (thickness of 1.4 mm) and the bolt retainer 64 is made of steel plate (thickness of 1.0 mm) with a zinc-plating layer.

Generally, the work that may be joined with the frictional spot joining comprises a plurality of metal members (a first metal member W1 and a second metal member W2). The metal members may be made of the same kind of material or different kinds of materials. According to the present embodiment in which different kinds of materials are used, the reinforcement 63 (aluminum alloy) corresponds to the first metal member W1 that has a relatively low melting point, and the bolt retainer 64 (zinc-plating steel plate) corresponds to the second metal member W2 that has a relatively high melting point.

Figure 8A:
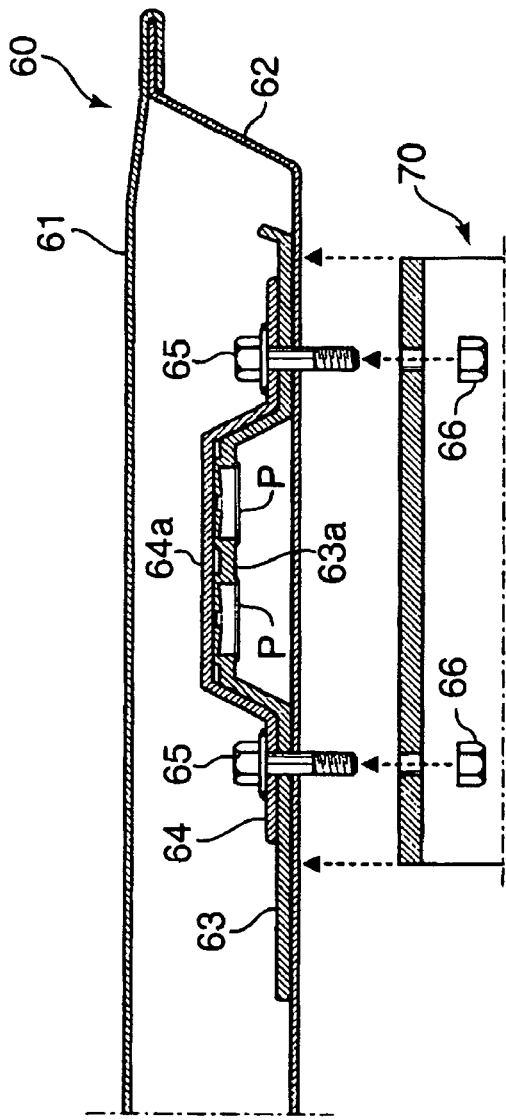
FIG. 8A is an exploded sectional view taken along line VIII-VIII of FIG. 7, showing a state where the hinge has not been attached to the trunk lid yet.
Figure 8B:
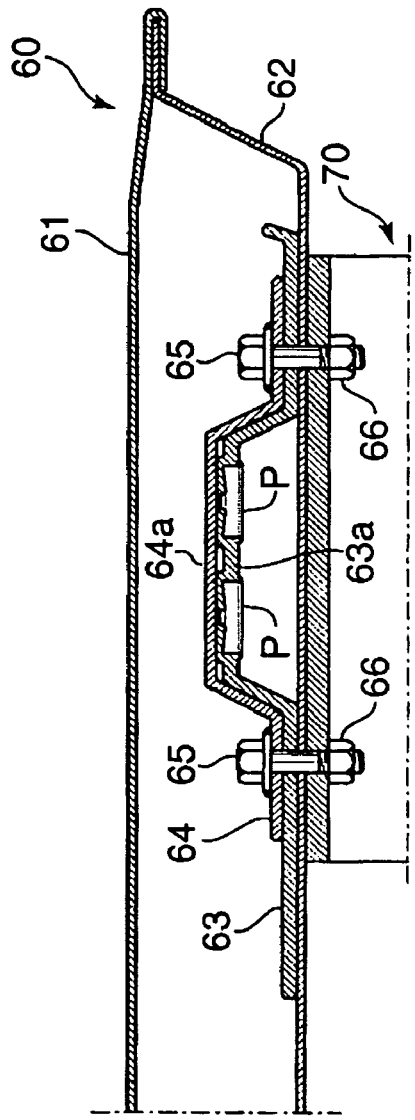
FIG. 8B is a sectional view taken along line VIII-VIII of FIG. 7, showing a state where the hinge has been attached to the trunk lid.

As shown in FIG. 8, the reinforcement 63 is attached to the inner panel 62 at the corner inside the trunk lid 60 via a proper means. And, the bolt retainer 64 is jointed to the reinforcement 63 with the frictional spot joining (with two joining points P). Screw portions of bolts 65, 65 fixed to the bolt retainer 64 by welding or the like project from the inner panel 62 and penetrate the hinge 70, and are fastened to the hinge 70 by nuts 66, 66. Herein, the frictional spot joining between the reinforcement 63 and the bolt retainer 64 functions a temporary fixing of the bolt retainer 64 to the trunk lid 60 until the hinge 70 has been attached to the trunk lid 60.

In this case, the joining points P are provided at bottom portions 63a, 64a of recesses formed at the reinforcement 63 and the bolt retainer 64. These recesses are formed in a circular shape, as apparent from FIG. 7, in order to increase the rigidity of the reinforcement 63 or form a space to remove waste R (see FIG. 15) that may be generated during the joining.

Then, the frictional spot joining method to joint the reinforcement 63 and the bolt retainer 64 that lap over will be described.

Figure 9:
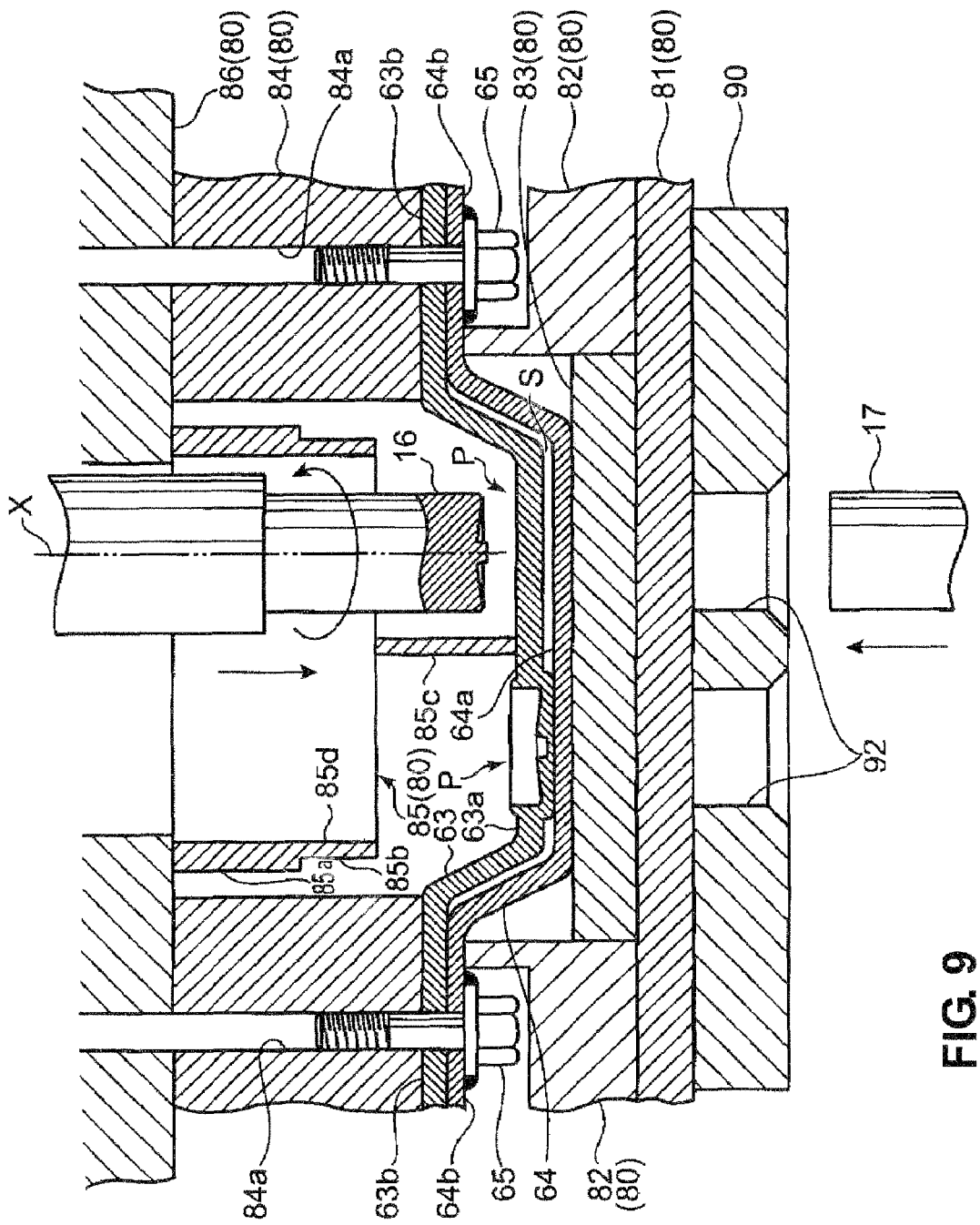
FIG. 9 is a sectional view showing a process of a frictional spot joining of a reinforcement of the trunk lid and a bolt retainer, which is executed by a method of the present invention using the frictional spot joining apparatus.

FIG. 9 shows a process of the frictional spot joining with the reinforcement 63 and the bolt retainer 64 of the work being fixed by a clamping tool 80 (specifically, a first clamping tool 81 through a sixth clamping tool 86) of the frictional spot joining apparatus 1. Namely, it shows a state the joining of the first joining point P (on the left side) is done, which is right before the start of the joining of the second joining point P (on the right side).

Although the rotating tool 16 is set to be located above and the receiving tool 17 is set to be located below in FIG. 9, these tools may be set at reverse positions respectively.

Also, in FIG. 9 a bottom portion 63a of the reinforcement 63 and a bottom portion 64a of the bolt retainer 64 are set with a small gap S (about 0.3-0.6 mm). This is to provide a certain gap around the joining point P after the joining, which allows an easier flowing-in of a coating material in an electrodeposition coating process (detailed description is omitted). In a general case without such a necessity, the both members can be set without any gap between the both bottom portions 63a, 64a.

The clamping tool 80 to fix the reinforcement 63 and the bolt retainer 64 in specified positions comprises a first clamping tool 81, a second clamping tool 82 and a third clamping tool 83, which are located on a side of the bolt retainer 64, and a forth clamping tool 84, a fifth clamping tool 85 and a sixth clamping tool 86, which are located on a side of the reinforcement 63. The second clamping tool 82 on the side of the bolt retainer 64 supports a base portion 64b of the bolt retainer 64. The third clamping tool 83 supports the bottom portion 64a of the bolt retainer 64. The first clamping tool 81 is located in a lowermost position and supports the second and third clamping tools 82, 83 together.

Meanwhile, the forth clamping tool 84 on the side of the reinforcement 63 supports a base portion 63b of the reinforcement 63. Bolt holes 84a are formed at the base portion 63b, and the screw portions of the bolts 65 are inserted into these bolt holes. Thereby, positioning of the work is conducted. The fifth clamping tool 85, which supports the bottom portion 63a of the reinforcement 63, specifically supports an intermediate portion between the two joining points P at the bottom portion 63a. This support is to prevent the intermediate portion between the two joining points P from rising away from the bottom portion 64a. A detailed structure of the fifth clamping tool 85 will be described below. The sixth clamping tool 86 is located in an uppermost position and supports the forth and fifth clamping tools 84, 85 together.

Below the first clamping tool 81 is provided a holding member 90 that is formed in a flat-plate shape. The holding member 90 is a member that restrains the runout of the receiving tool 17 (a movement in a direction substantially perpendicular to the rotational axis X of the rotating tool 16) at the joining, not a member to fix the work. The holding member 90 includes through holes 92 (restriction portions) at locations that correspond to the joining points P respectively. Each through hole has a diameter that is nearly an outer diameter of the receiving tool 17 (for example, (the outer diameter of the receiving tool 17)+0.2 mm) so that the receiving tool can be allowed to go therein.

Herein, the clamping tool 80 and holding tool 90 are fixed firmly with a clamping mechanism having a hydraulic cylinder or the like, fixing bolts and so on (not illustrated here).

Figure 10:
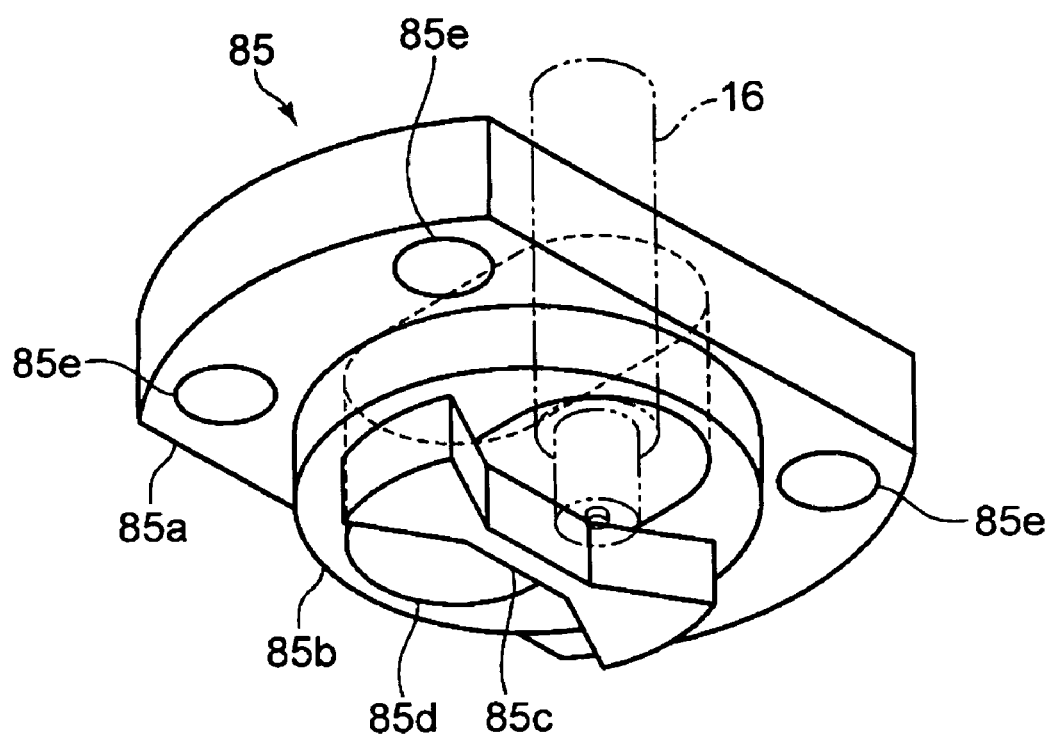
FIG. 10 is a perspective view of one clamping tool that is used in the frictional spot joining apparatus and method.

FIG. 10 is a perspective view of the fifth clamping tool 85, when viewed from below. The first, second, third, forth and sixth clamping tools 81, 82, 83, 84 and 86 are of a substantially flat-plate shape, but the fifth clamping tool 85 has a rather complicated shape since it is located to support in a narrow space. The fifth clamping tool 85 has a three-story structure, having a base portion 85a located in the uppermost position, a middle portion 85b and a top end portion 85c located in the lowermost position.

The base portion 85a in a flat-plate shape has four bolt holes 85e at corners. The fifth clamping tool 85 and the sixth clamping tool 86 are fixed together by bolts, not illustrated, which are inserted into these bolt holes 85e.

The middle portion 85b is of a circular-plate shape, which seems like a shape that could be made by raising part of the base portion 85a except part of the bolt holes 85e. It has a hole portion 85d that allows the base portion 85a and the middle portion 85b to go therein. The hole portion 85d has an oval cross section that encompasses the two joining points P and would not interfere with the rotating tool 16 located in any positions at the joining points P (a state of the rotating tool 16 located in the position at one joining point P is illustrated by a two-dotted broken line in the figure).

The top end portion 85c is a member that is formed to project from the middle portion 85b. A tip of the portion 85c presses directly the intermediate portion between the joining points P of the bottom portion 63a of the reinforcement 63, and thereby the intermediate portion can be prevented from rising (projecting) at the joining. The top end portion 85c is configured to cross the oval hole portion 85d like between straight-line portions of the hole portion 85d, so that it would not interfere with the rotating tool 16 located in any positions at the joining points P.

Accordingly, the fifth clamping tool 85 can support the relatively narrow intermediate portion between the joining points P properly, without badly influencing on the movement of the rotating tool 16 at the joining.

Also, at the joining the rotating tool 16 is let go down into the hole portion 85d without interfering with the top end portion 85c. Namely, it is let go down through a narrow space between the middle portion 85b and the top end portion 85c.

Next, operation of the joining point P at the frictional spot joining will be described. First, as shown in FIG. 9, the joining gun 10 is moved by the robot 40 so as to approach the joining point P, where the rotating tool 16 is located on the side of the reinforcement 63 and the receiving tool 17 is located on the side of the bolt retainer 64. Subsequently, the joining gun 10 is moved to the side of the bolt retainer 64, namely, such that the receiving tool 17 approaches the bolt retainer 64.

Figure 11A:
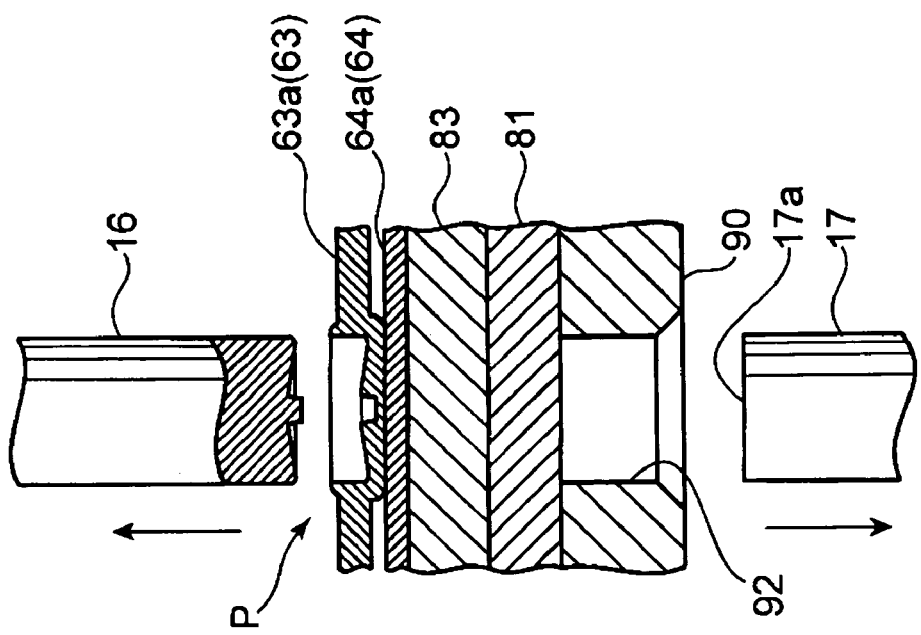
FIG. 11A is a sectional view showing a state at the frictional spot joining of the process shown in FIG. 9.

Although on the side of the bolt retainer 64 are provided the third clamping tool 83, first clamping tool 81 and holding member 90, the receiving tool 17 approaches the side of the bolt retainer 64 and then goes into the through hole 92, and eventually its tip 17a contacts the lower face of the clamping tool 80 (specifically, the first clamping tool 81) and stops there. Then, in this state, the rotating tool 16 is rotated and moved toward the reinforcement 63 by the pressing motor 14 and rotating motor 15, and pressed to execute the frictional spot joining as shown in FIG. 11A. Process of this joining comprises an initial moving step, first pressing step, second pressing step, and third pressing step. Hereinafter, these steps will be described in detail.

In the initial moving step, the rotating tool 16 is moved to go down to an initial position close to the reinforcement 63, where the tip of the pin 16c of the rotating tool 16 is very close to the reinforcement 63, not contacting it. Although the rotating tool 16 may be or not under rotation in the initial moving step, it is under rotation with the same rotational speed as that in the subsequent first pressing step (with a first rotational speed) in the present embodiment, so that the rotating tool 16 can smoothly change its state to the first pressing step.

Figure 12:
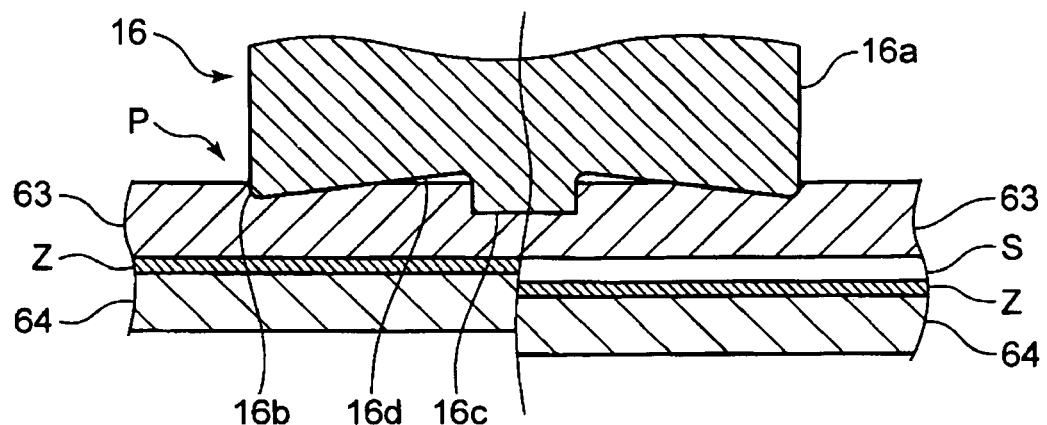
FIG. 12 is an explanatory diagram of a first pressing step of the frictional spot joining, showing specifically the state shown in FIG. 11A.

In the first pressing step, as shown in FIG. 12, the rotating tool 16 under rotation with the first rotational speed is pressed down by the pressing motor 14 with a first pressing force that is greater than a moving resistance of the rotating tool 16 in the initial moving step in such a manner that the shoulder portion 16b and pin 16c contact the reinforcement 63 for a first specified period. Herein, a right-half part illustrates a state where there is provided the gap S between the reinforcement 63 and the bolt retainer 64, and a left-half part illustrates a state where no gap S is provided and the both contact each other.

Herein, since the pressing force of the rotting tool 16 against the reinforcement 63 is determined according to an electric current supplied to the pressing motor 14, the above-described control unit 50a controls the electric current supplied to the pressing motor 14 such that the pressing force can be the above-described first pressing force for the above-described specified period in the first pressing step. Also, since the rotational speed of the rotating tool 16 is determined according to an electric current supplied to the rotating motor 15, the control unit 50a controls the electric current supplied to the rotating motor 15 such that the rotational speed can be the above-described first rotational speed in the first pressing step (and the initial moving step).

Generally, the above-described moving resistance, which may be determined by a frictional resistance in a mechanism for moving the elevating cylinder 33 (rotating tool 16) that is comprised of the screw shaft 24, elevating member 30 and so on, is not stable, changeable according to the amount of gap or grease between a moving portion and a fixed portion. Accordingly, if the first pressing force is less than the moving resistance, the time period before the first pressing force acts on the reinforcement 63 actually would be changeable according to the magnitude of the moving resistance, and therefore an actual time of pressing with the first pressing force would become unstable within the first specified period. According to the present embodiment, however, since the first pressing force is set to be greater than the moving resistance, the shoulder portion 16*b* and the pin 16*c* of the rotating tool 16 can be pressed against the reinforcement 63 with the first pressing force right after the starting of the first pressing step, regardless of the magnitude of moving resistance. Thus, the time period of the first pressing force acting on the reinforcement 63 can become substantially the same as the first specified time and therefore stable.

It is preferable that the first pressing force be set to be greater than a maximum magnitude of the moving resistance that may change within a changing range, between 2.45 and 3.43 kN. Also, it is preferable that the first rotational speed be set to be between 1500 and 3500 rpm, and that the first specified time be set to be between 0.2 and 2.0 sec. The first pressing force, first rotational speed and first specified time are respectively set so properly that the rotating tool 16 can be pressed against the reinforcement 63 in such a manner that part of the bottom face of the ring-shaped recess 16*d* (a deep portion near the rotational axis X) does not contact the reinforcement 63 but a peripheral edge portion of the shoulder 16*b* and the pin 16*c* contact the reinforcement 63.

In the first pressing step, the pressing of the peripheral edge portion of the shoulder portion 16*b* and the pin 16*c* under rotation around the axis X against the reinforcement 63 generate a frictional heat at two contact points. The frictional heat diffuses to part of the work between these two contact points (a portion where the bottom face of the ring-shaped recess 16*d* does not contact) and then to an entire part of the joining spot P, and thereby an entire part of the reinforcement 63 that the shoulder portion 16*b* faces (i.e., joining point P) is softened properly. Also, the zinc-plating layer Z formed on the surface of the bolt retainer 64 is softened at the joining point P. Accordingly, by properly setting the first pressing force, first rotational speed and first specified time, the reinforcement 63 can be softened effectively without occurring a shearing breakage.

In an early stage of the first pressing step, the pin 16*c* projecting by the length h from the shoulder portion 16*b* contacts the reinforcement 63 in advance, prior to the shoulder portion 16*b*. This advanced contact of the narrow pin 16*c* can provide a proper centering of the rotating tool 16 with a smaller frictional resistance, thereby restraining the rotational runout in the direction perpendicular to the rotational axis X of the tool 16 (anchor function).

Figure 13:
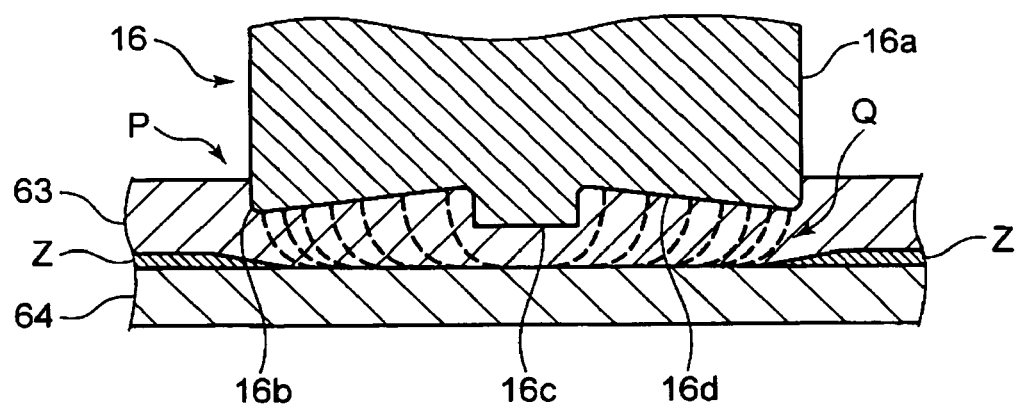
FIG. 13 is an explanatory diagram of a second pressing step that follows the first pressing step.

In the subsequent second pressing step, as shown in FIG. 13, the rotating tool 16 is rotated by the rotating motor 15 at the second rotational speed and the shoulder portion 16*b* and the pin 16*c* are pressed by the pressing motor 14 against the reinforcement 63 with the second pressing force greater than the first pressing force for the second specified time.

In the second pressing step, since the pressing force becomes greater, the shoulder portion 16*b* and the pin 16*c* go into the reinforcement 63 deeply, so that the entire bottom face of the ring-shaped recess 16*d*, namely the entire shoulder portion 16*b* including the pin and the recess 16*d* contacts the reinforcement 63. Thus, the plastic flow is generated in addition to the softening of the reinforcement 63 (the plastic flow Q is schematically illustrated by broken lines in the figure). Herein, in the case where the gap S is provided between the reinforcement 63 and the bolt retainer 64, the reinforcement 63 is pushed toward the bolt retainer 64 by the plastic flow Q and the both contact each other closely.

Further, since the ring-shaped recess 16*d* is formed at the shoulder portion 16*b* (particularly, the recess 16 has the corn shape), the reinforcement 63 in the plastic flow tends to move vertically in the figure, thereby preventing effectively its flowing out from a portion (joining point P) that is located just below the rotating tool 16. Also, the second pressing force is focused on the joining point P by the ring-shaped recess 16*d*, thereby promoting the plastic flow Q of the reinforcement 63. Further, at a joining boundary face between the reinforcement 63 and the bolt retainer 64, part of the zinc-plating layer Z that has been softened or melt is pushed out from the joining point P, so that a new uncovered surface of the bolt retainer 64 is exposed. Also, an oxidation film, not illustrated, which has been formed on the surface of the reinforcement 63 due to oxygen in the air, is destroyed at the joining point P, so that a new uncovered surface of the reinforcement 63 is exposed.

It is preferable that the second pressing force be set to be between 3.92 and 5.88 kN. Also, it is preferable that the second rotational speed be set to be between 2000 and 3000 rpm, and that the second specified time be set to be between 1.0 and 2.0 sec. The second pressing force, second rotational speed and second specified time are respectively set so properly that the rotating tool 16 does not go into reinforcement 63 more deeply from a specified position. This specified position is such that if the rotating tool 16 goes into further deeply, the reinforcement 63 may become too thin and be torn away.

Herein, there is a concern that the rotational runout would occur during a time period from the late first pressing step to the early second pressing step. Namely, according to the contact resistance rapidly increases during this time period, a large rotational runout would occur despite the anchor function performed by the pin 16*c*. And, there is a concern that this large rotational runout would cause an adhesion of part of the work to the shoulder portion 16*b* (particularly, in the case the ring-shaped recess 16*d* is formed). This adhesion would deteriorate the above-described anchor function and promote the runout improperly. Thereby, the runout would occur more badly. This runout would deteriorate the joining quality, cause some damage to the rotating tool 16, drive mechanism (such as the bearings 25*b*, 35*a*, 33*a* shown in FIG. 4), clamping tool 80 and so on.

Then, according to the present embodiment, this rotation runout of the rotating tool 16 is effectively restrained by the holding member 90 and the through holes 92 (restriction portion) as described below.

The rotating tool 16 and the drive device (pressing motor 14 and rotating motor 15) are provided at the joining gun 10 (joining device) as shown in FIG. 2. Accordingly, if the rotational runout of the rotating tool 16 occurs, the joining gun also vibrate as a whole. This vibration is transmitted to the receiving tool 17 through the L-shaped arm 12. Thus, unless there is provide any means to restrain the movement of the receiving tool 17, the runout of the receiving tool 17 (vibration in direction perpendicular to the rotational axis X) is caused by the rotating tool 16 having the rotational runout.

According to the present embodiment, however, the receiving tool 17 is put into the through hole 92 of the holding member 90 as shown in FIG. 11A and thereby its runout is restrained. And, the vibration of the joining gun 10 is restrained by a reaction function of this restraint, and accordingly the rotational runout of the rotating tool 16 is also restrained. The adhesion of the work to the shoulder portion 16*b* is properly prevented by this restraint of the rotational runout. Thus, promotion of the rotational runout, decrease of joining quality, any damage of the rotating tool 16, its drive mechanism or the clamping tool 80 can be avoided properly.

Further, the runout restraint of the receiving tool 17 is achieved with a very simple structure of the through hole 92 formed at the flat-plate-shaped holding member 90. Accordingly, comparing with the conventional restraint structure of the rotating tool 16 using springs, bearings and so on, smaller size and low costs of the device can be further achieved. Also, this is particularly advantageous for the rotating tool 16 that needs to go through a narrow space between the middle portion 85b and the top end portion 85c of the fifth clamping tool 85 to have access to the joining point P. Further, this should be advantageous when the receiving tool 17 is arranged to go through a narrow space as well.

The second pressing step is complete in the state where the rotational runout is effectively restrained accordingly. Although the joining at the joining point P may be finished with the completion of the second pressing step, the present embodiment has additional third pressing step.

Figure 14:
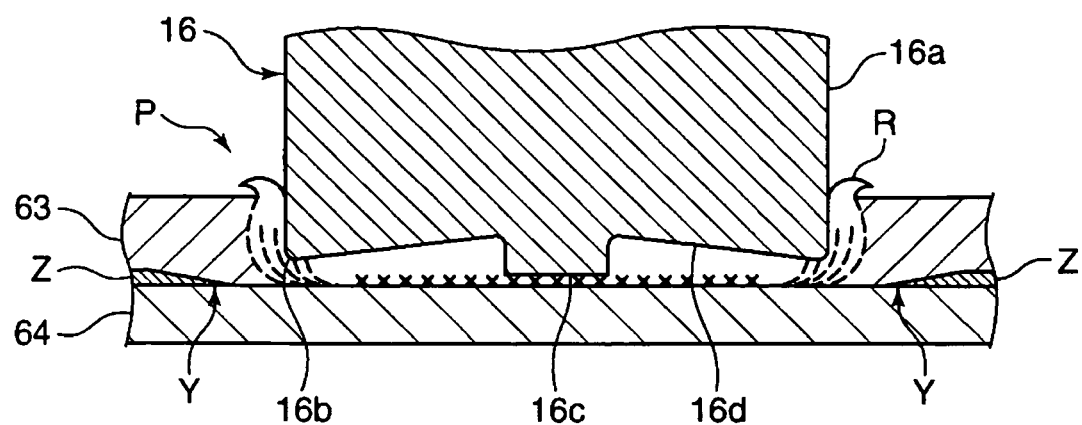
FIG. 14 is an explanatory diagram of a third pressing step that follows the second pressing step.

In the third pressing step, as shown in FIG. 14, the rotating tool 16 is rotated by the rotating motor 15 at the third rotational speed and the shoulder portion 16b and the pin 16c are pressed by the pressing motor 14 against the reinforcement 63 with the third pressing force smaller than the second pressing force for the third specified time.

In the third pressing step, since the pressing force is smaller than the second pressing force, the rotating tool 16 would not go into deeper from the above-described specified position and keep remained at the position when the second pressing step is complete. Thus, it is avoided that the reinforcement 63 would become too thin and be torn away. And, the temperature that is substantially the same as that in the second pressing step is maintained and thereby a proper plastic flow is provided for a long period. When this third pressing step is complete, the joining at the joining spot P is finished.

It is preferable that the third pressing force be set to be lower than the first pressing force and between 0.49 and 1.47 kN. Also, it is preferable that the third rotational speed be set to be between 1500 and 3500 rpm, and that the third specified time be set to be between 0.5 and 2.5 sec. The third pressing force, third rotational speed and third specified time are respectively set so properly that the rotating tool 16 pressed against the reinforcement 63 can be kept in the position at the completion of the second pressing step and the plastic flow of the reinforcement 63 can occur.

In the third pressing step, a metal material pushed out by the rotating tool 16 rises out on the surface of the reinforcement 63 as the waste R and the zinc-plating layer Z is further pushed out from the joining point P. Also, the oxidation film is further destroyed and thereby the exposure range of the new uncovered surfaces of the reinforcement 63 and bolt retainer 64 is enlarged (the range shown with x marks in FIG. 14). As a result, the both surfaces are joined together firmly in the sold state, so that the joining strength becomes stably high.

Herein, at a portion of the zinc-plating layer Z near the joining point P, a metal-mixed layer Y that is comprised of the metal (aluminum alloy) of the reinforcement 63 and the metal of the zinc-plating layer Z is formed.

Figure 11B:
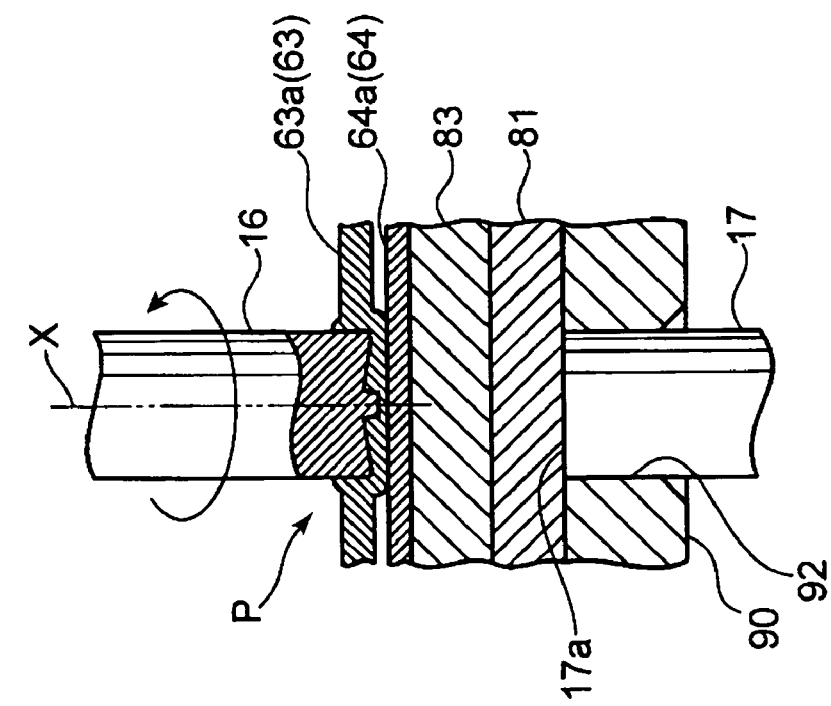
FIG. 11B is a sectional view showing a state right after the frictional spot joining of the process shown in FIG. 9.
Figure 15:
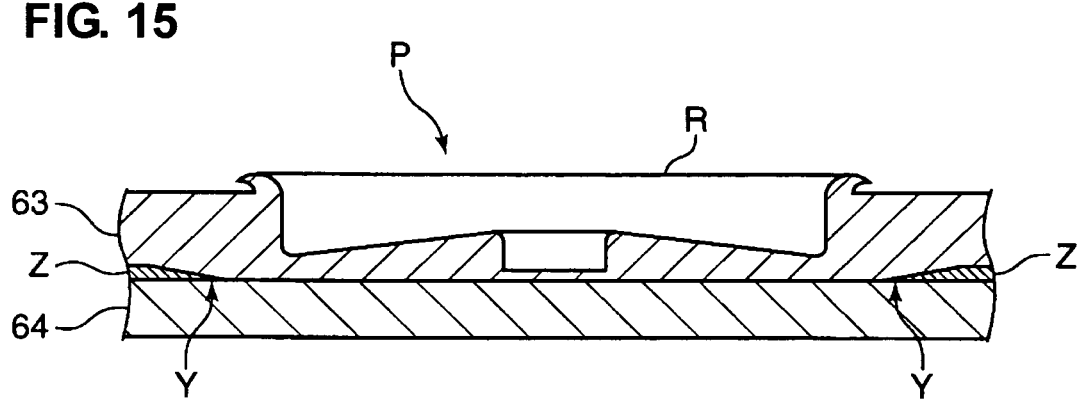
FIG. 15 is a diagram showing a state where the frictional spot joining is complete after the third pressing step.

When the joining at the joining spot P is complete, as shown in FIG. 11B, the screw shaft 24 is rotated by the pressing motor 14 in the direction B in FIG. 5 and thereby the rotating tool 16 is pulled up. And, the joining gun 10 is moved down and thereby the receiving tool 17 is pulled down out of the through hole 92. After the joining, as shown in FIG. 15, a joining spot mark of the shoulder portion 16b and pin 16c remains on the surface of the reinforcement 63 and the waste R is formed around the shoulder portion 16b.

When the jointing at the joining spot P is complete, the joining gun 10 is moved to a standby position by the robot 40 controlled by the control unit 50a. In a case where the joining is executed to another joining spot P subsequently, the gun 10 is moved to that position and the joining process described above is repeated.

Although one embodiment of the present has been described as above, the present invention should not be limited to this and any other modifications and improvements may be applied within the scope of the present invention.

For example, although the present invention is applied to the frictional spot joining of the reinforcement 63 (aluminum alloy) and the bolt retainer 64 (zinc-plating steel plate) in the above-described embodiment, the joining can be applied to other members. Also, the material of those members should not be limited. The same material or different materials can be similarly applied. Also, the number of members to be joined should not be limited to the two. Three members or more can be also applied.

Also, the shoulder portion 16b of the rotating tool 16 does not necessarily have the ring-shaped recess 16d. Instead, the shoulder portion 16 having a substantially flat face may be used.

Although the restriction portion to restrain the runout of the receiving tool 17 comprises the through hole 92 formed at the holding member 90 in the above-described embodiment, another structure may be applied. For example, a plurality of slender cylinders may be provided so as to surround the side face of the receiving member 17 and restrain the runout of the receiving member 17. Also, although the receiving tool 17 is moved to the restriction portion (through hole 92) of the holding member 90 by the robot 40 in the above-described embodiment, the receiving tool 17 may be provided at the joining gun 10 so as to move vertically and it is moved to the restriction portion (through hole 92) by the drive device. However, the fixed disposition of the receiving tool 17 to the joining gun 10 may be better in terms of the effective restraint of the rotational runout of the rotating tool 16.

The receiving tool 17 of the above-described embodiment is configured such that its tip 17a contacts the work via the clamping tool 80 that comprises two members (first clamping tool 81 and third clamping tool 82). Herein, the clamping tool 80 may comprise one member or three members or more. Or, the receiving tool 17 may be configured such that its tip 17a contacts the work direction without any clamping tool. However, the above-described embodiment of the receiving tool 17 with the tip 17a contacting the work via the clamping tool can avoid any problems that would be caused by the constitution of the receiving tool 17 with the tip 17a directly contacting the work. For example, according to the above-described embodiment, it can be prevented that the softened or melt zinc-plating layer Z of the bolt retainer 64 adheres to the receiving tool 17 by the heat and pressing force at the joining. Also, in a case where the face of the work that the receiving tool 17 contacts constitutes an outer surface of a vehicle panel, a pressing spot mark that may be formed by the contact of the receiving tool 17 would deteriorate the quality of a product of the vehicle.

Also, the holding member 90 may be formed integrally to the clamping member 80. For example, according to the above-described embodiment, the first clamping tool 81 and the holding member 90 may be formed integrally. However, in the case where the first clamping tool 81 and the holding member 90 are formed separately, the flexibility would be more superior. Because even if the location of the joining point P needs to be changed according to a design changing or a production with different kinds, this requirement may be met by exchanging and selecting a proper holding member having a suitable location of the through hole 92.

The rotating tool 16 or the joining gun 10 need not to be provided at the robot 40, and it may be provided at an automatic machine that can move in a direction of three axes, X, Y and Z axes. However, the layout that these tools 16, 17 are provided at the robot 40 may provide a superior joining with a high moving flexibility where the joining can be executed properly even in a relatively narrow area.

Also, the shape (dimensions of portions) of the rotating tool 16, the gap between the receiving tool 17 and the through hole 92, or various parameters such as the pressing force may be properly determined according to usage or various conditions thereof.

What is claimed is:

1. A frictional spot joining apparatus, in which a plurality of metal members that lap over are jointed, comprising:
    a joining device that comprises a rotating tool, a receiving tool that is disposed to face the rotating tool substantially on a rotational axis of the rotating tool, and a drive device that rotates and moves the rotating tool in a pushing direction toward the metal members, the rotating tool and the receiving tool being connected to each other via a connecting arm member, the metal members lapping over being located between the rotating tool and the receiving tool of the joining device when being joined, the rotating tool being pushed against one of the metal members without reaching the other metal member such that the one of the metal members is softened and made in a plastic flow state by a frictional heat generated by the rotating tool;
    a holding member that is located on a side of the receiving tool when the metal members are joined, the holding member having a through hole that has an inner-diameter shape that mates with an outer-diameter shape of the receiving tool; and
    a moving device that moves the joining device such that said rotating tool, receiving tool and connecting arm member are moved together in a direction that is substantially perpendicular to the rotational axis of the rotating tool and that the receiving tool is moved in a direction of the rotational axis of the rotating tool independently from said moving direction substantially perpendicular to the rotational axis so as to get in or get out of said through hole of the holding member,
    wherein in case the receiving tool gets in the through hole of the holding member when the metal members are joined, a movement of the receiving tool in said direction substantially perpendicular to the rotational axis of the rotating tool is restrained by the through hole of the holding member.

2. The frictional spot joining apparatus of claim 1, wherein said metal members comprise a first metal member and a second metal member, a melting point of the second metal member being higher than that of the first metal member, said rotating tool comprises a shoulder portion that is formed at a tip thereof having a ring-shaped recess and a pin that projects from the shoulder portion to be located substantially on the rotational axis of the rotating tool, and the rotating tool is pushed against the first metal member such that the rotating tool goes into the first metal member without reaching the second metal member, whereby only the first metal member can be softened and made in the plastic flow state by the frictional heat generated by the rotating tool and spot faces of the first and second metal members are joined in a solid state.

3. The frictional spot joining apparatus of claim 1, further comprising a clamping tool to fix the metal members lapping over in a joining position, wherein said holding member is fixed to the clamping tool that contacts a face of a joining area of the metal members, and a tip of said receiving tool supports the metal members via said clamping tool.

4. The frictional spot joining apparatus of claim 1, wherein said moving device comprises a robot.

* * * * *